United States Patent [19]

Negi et al.

[11] Patent Number: 5,346,950
[45] Date of Patent: Sep. 13, 1994

[54] RESIN COMPOSITION

[75] Inventors: Taichi Negi, Kurashiki; Akira Mochizuki, Tsukuba; Shiro Nagata, Kurashiki; Komei Yamasaki, Ichihara; Keisuke Funaki, Ichihara; Takashi Sumitomo, Ichihara, all of Japan

[73] Assignees: Kuraray Co., Ltd., Kurashiki; Idemitsu Petrochemical Co., Ltd., Tokyo, both of Japan

[21] Appl. No.: 140,886

[22] Filed: Oct. 25, 1993

Related U.S. Application Data

[60] Continuation of Ser. No. 794,582, Nov. 19, 1991, , which is a division of Ser. No. 413,997, Sep. 28, 1989, Pat. No. 5,089,353.

[30] Foreign Application Priority Data

Oct. 14, 1988 [JP] Japan .................................. 63-260235
Oct. 21, 1988 [JP] Japan .................................. 63-266898

[51] Int. Cl.⁵ ...................... C08L 29/02; C08L 25/04; C08L 25/06
[52] U.S. Cl. ......................................... 525/57; 525/56; 525/241
[58] Field of Search ............... 525/57, 241, 56

[56] References Cited

U.S. PATENT DOCUMENTS 3,949,114  4/1976  Viola et al. .
4,883,696  11/1989 Iwanami et al. .................... 525/57
5,004,649  4/1991  Yamasaki et al. .................. 428/461
5,071,917  12/1991 Pederson et al. ................... 525/241
5,089,353  2/1992  Negi et al. ............................ 525/57
5,169,893  12/1992 Beck .................................... 525/241

FOREIGN PATENT DOCUMENTS 0210615   2/1987  European Pat. Off. .
0324398   7/1989  European Pat. Off. .
0337316   10/1989 European Pat. Off. .
50-75239  4/1975  Japan .
0075239   6/1975  Japan ..................................... 525/57
54-46281  4/1979  Japan .
60-26072  2/1985  Japan .
60-107337 6/1985  Japan .
62-104818 5/1987  Japan .
62-187708 8/1987  Japan .
62-257948 11/1987 Japan .
62-257950 11/1987 Japan .
63-77905  4/1988  Japan .

Primary Examiner—James J. Seidleck
Assistant Examiner—W. Robinson H. Clark
Attorney, Agent, or Firm—Oblon, Spivak, McClelland, Maier & Neustadt; Oblon, Spivak, McClelland, Maier & Neustadt

[57] ABSTRACT

A resin composition comprising 5 to 95 parts by weight of a saponified product of an ethylene-vinyl acetate copolymer (A) having an ethylene content of 20 to 60 mol % and a degree of saponification of at least 90% and 95 to 5 parts by weight of a styrene-based polymer (B) having mainly syndiotactic configuration. The resin composition has gas barrier properties and a markedly improved heat resistance.

11 Claims, No Drawings

RESIN COMPOSITION

This application is a continuation of application Ser. No. 07/794,582, filed on Nov. 19, 1991, now abandoned, which is a division of application Ser. No. 07/413,997, filed on Sep. 28, 1989, now U.S. Pat. No. 5,089,353.

BACKGROUND OF THE INVENTION

Field of the Invention

The present invention relates to a multi-layer material having gas barrier properties and high heat resistance, and a resin composition to produce a molding having such gas barrier properties and high heat resistance. More particularly the present invention relates to a multi-layer material and a resin composition to produce a molding (especially containers) which can be transported at ambient temperature, because retort sterilization (high temperature steam) is possible and can be stored for a long period of time, and further which has such high gas barrier properties as to permit heating directly by boiling, or in an electric range or a grill oven (220° to 240° C.) without transferring its contents (food) into another container.

DESCRIPTION OF THE RELATED ARTS

Various resin containers are on the market, advertizing that the contents placed in the containers, after refrigeration transportation, can be heated by boiling, or in an electric range or a grill oven (not more than 220° C.) without transferring the contents into another container. Most of these containers are made of crystalline thermoplastic resins such as polyester (C-PET), polypropylene and poly(4-methylpentene). If these containers are put in grill ovens or oven toasters presently used in homes, problems such as distortion of the container often occur because the temperature rises above the temperature to which the containers can withstand. It has therefore been desired to develop a container which can overcome the above problems and which has excellent heat resistance, satisfying the requirements of the market.

A multi-layer material having a general-purpose polystyrene (atactic) layer and a saponified product of an ethylene-vinyl acetate copolymer layer (EVOH) laminated onto each other is well known (Japanese Patent Application Laid-Open. Nos. 46281/1979, 107337/1985 and 26072/1985). This type of multi-layer material is widely used in food containers because it has the high moldability and the high transparency inherent in the general-purpose polystyrene and the gas barrier properties inherent in EVOH. This multi-layer structure, however, cannot be used, for example, in a microwave oven or an oven range because it has low heat resistance.

Compounding the general-purpose polystyrene and EVOH is also known as described in, for example, Japanese Patent Application Laid-Open No. 75239/1975. Although this composition shows improvement in hygroscopicity, oil resistance and gas barrier properties to a certain extent, mechanical characteristics are insignificantly improved and moreover heat resistance is low. Thus the composition cannot be used in, for example, microwave oven or oven ranges.

SUMMARY OF THE INVENTION

An object of the present invention is to provide a multi-layer material which has gas barrier properties and enables food storage for a long period of time.

Another object of the present invention is to provide a multi-layer material which has gas barrier properties and is able to store food, and dose not deform even if heated in or grill oven.

Still another object of the present invention is to provide a resin composition to produce moldings (especially containers) which has gas barrier properties and in which food can be stored for a long period of time.

Another object of the present invention is to provide a resin composition to produce moldings (especially containers) which has gas barrier properties and can be used to store food, and which is free from deformation even if heated in microwave oven or grill oven.

The above objects can be attained by laminating (A) a layer of EVOH and (B) a layer of a styrene-based polymer having mainly syndiotactic configuration (hereinafter sometimes referred to as "SPS"), or by using a composition of (A) EVOH and (B) SPS.

That is, the present invention provides a resin composition comprising (A) a saponified product of an ethylene-vinyl acetate copolymer having an ethylene content of 20 to 60 mol % and a degree of saponification of at least 90% and (B) a styrene-based polymer having mainly syndiotactic configuration, with the weight ratio of (A) to (B), (A)/(B), being 5/95 to 95/.5.

The present invention further provides a multi-layer material having (A) a layer of a saponified product of an ethylene-vinyl acetate copolymer having an ethylene content of 20 to 60 mol % and a degree of saponification of at least 90% and (B) a layer of a styrene-based polymer having mainly syndiotactic configuration.

DESCRIPTION OF THE PREFERRED EMBODIMENTS

As a result of investigations to develop a multi-layer material having heat resistance and gas barrier properties, it has been found that a material obtained by combining SPS and EVOH is markedly excellent in characteristics and moldability. For example, if an acrylonitrile-based resin or a vinylidene chloride-based resin as a gas barrier resin, is combined with SPS, the resulting material is unsuitable for practical use because coloration and odor generation vigorously occur when the temperature in the oven range is increased, for example, to about 230° C. If a liquid crystalline polymer is used as a heat resistant resin, it is difficult to form a container by heat molding or stretch blow molding after lamination onto EVOH, and the molding obtained is readily subject to cracking. On the contrary, if a composite system of EVOH and SPS of the present invention is used, a desired molding can be obtained without causing problems such as coloration and odor.

Reuse of a large amount of trim and scrap formed at the time of molding is important in this field from a viewpoint of reducing production costs. However, in the case of a multi-layer material using a gas barrier resin such as an acrylonitrile-based resin or a vinylidene chloride-based resin, its reuse is impossible because it encounters coloration, odor, gel or lump. On the contrary, in the case of the multi-layer material of the present invention, such problems are not encountered in the reuse of the recovered resin. It is one of its great advantages that the recovered resin can be reused in producing moldings.

As a result of studies on blending various heat resistant resins and various gas barrier resins, it has been found that among a number of resins, a blend of SPS and EVOH is markedly excellent in moldability and characteristics of the resulting molding.

For example, if EVOH is blended with polycarbonate or polyester, the heat stability of EVOH is not improved, while on the other hand, if EVOH is blended with SPS, the heat stability of EVOH is unexpectedly improved. If an acrylonitrile-based resin or a vinylidene chloride-based resin used as a gas barrier resin is blended with SPS, the resulting composition is unsuitable for practical use because coloration and generation of odor vigorously occur. On the contrary, in the case of the blend of EVOH and SPS in the present invention, such problems do not occur. When SPS and EVOH are blended, the resulting composition has unexpected gas barrier properties which are much superior to those of compositions of other polymers and EVOH. Although the reason for this is unclear, it is suspected that in the blend of SPS and EVOH, EVOH forms a specific stereostructure.

In the present invention, EVOH (A) is a saponified product of an ethylene-vinyl acetate copolymer, having an ethylene content of 20 to 60 mol %, preferably 25 to 50 mol % and a degree of saponification of at least 90%, preferably at least 95%. If the ethylene content is less than 20 mol %, melt moldability is poor. On the other hand, if it is more than 60 mol %, gas barrier properties are poor.

If the degree of saponification is less than 90%, gas barrier properties and heat stability are poor.

EVOH may be copolymerized with other comonomers such as propylene, butylene, unsaturated carboxylic acids or their esters (e.g., (metha)acrylic acid, (metha)acrylic acid (e.g., methyl or ethyl) ester), vinyl silane compounds (e.g., vinyltrimethoxysilane or triethoxysilane), and vinylpyrrolidone (e.g., N-vinylpyrrolidone). Moreover EVOH may be blended with plasticizers, thermal stabilizers, unltraviolet absorbers, antioxidants, colorants, fillers and other resins (e.g., polyamide, partially saponified ethylene-vinyl acetate copolymer), The melt index (MI) (190° C., load of 2,160 g) is preferably 0.1 to 50 g/10 minute and more preferably 0.5 to 20 g/10 minute.

A styrene-based polymer having mainly syndiotactic configuration (SPS) to be used as (B) in the present invention is a new material completely different from the conventional atactic polystyrene and has crystallization behavior and heat resistant characteristics as described in Japanese Patent Laid-Open Nos. 104818/1987, 187708/1987, 257948/1987, 257950/1987 and 77905/.1988. This styrene-based polymer has a stereostructure that is mainly a syndiotactic structure, i.e., phenyl groups or substituted phenyl groups as side chains are located alternately at opposite positions relative to the main chain composed of carbon-carbon bonds, and its tacticity is quantitatively determined by a nuclear magnetic resonance (NMR) method.

The tacticity as determined by NMR can be indicated in terms of proportion of structural units continuously connected to each other, i.e., a diad in which two structural units are connected to each other, a triad in which three structural units are connected to each other, and a pentad in which five structural units are connected to each other. SPS of the present invention has a syndiotactic configuration such that the proportion in a racemic diad is at least 85%, or the proportion in a racemic pentad is at least 35%. SPS includes polystyrene, poly(alkystyrene), poly(halogenated styrene), poly(alkoxystyrene), poly(vinylbenzoate) and their mixtures, and copolymers containing the above polymers as main components.

The poly(alkylstyrene) includes polymethylstyrene, polyethylstyrene, polyisopropylstyrene and poly(tert-butylstyrene). The poly(halogenated styrene) includes polychlorostyrene and polybromostyrene. The poly(alkoxystyrene) includes polymethoxystyrene and polyethoxystyrene and the copolymer includes a copolymer of styrene and paramethylstyrene.

The styrene-based polymer to be used in the present invention is not critical in molecular weight. The weight average molecular weight is preferably at least 10,000 and particularly preferably 50,000 to 3,000,000. If the weight average molecular weight is less than 10,000, stretching cannot be carried out sufficiently. The molecular weight distribution is not critical and may be narrow or broad.

Such styrene-based polymers having mainly syndiotactic configuration can be produced by polymerizing styrene-based monomers (monomers corresponding to the above styrene-based polymers) in the presence of e.g., an inert hydrocarbon or in the absence of a solvent by the use of a catalyst comprising a titanium compound and a condensate of water and trialkylaluminum (see Japanese Patent Application Laid-Open No. 187708/1987).

Within the range such that they do not deteriorate the objects of the present invention, other thermoplastic resins, rubbers, inorganic fillers, colorants, antioxidants, ultraviolet absorbers, cross-linking agents, crystallization accelerators, anti-static agent and the like can be blended with SPS.

Although the multi-layer material of the present invention is preferably produced by coextruding (A) and (B), it can also be produced, for example, by dry lamination of (A) and (B), extrusion lamination of (B) onto the layer (A) or (A) onto the layer (B), coinjection of (A) and (B), or solution coating of (B) onto the layer (A) or (A) onto the layer (B). In some cases, the layer (A) and/or the layer (B) is stretched (monoaxially or biaxially) before or after lamination, and after stretching, is further heat fixed or heat treated. In this case, it is often preferred that an adhesive resin layer (C) mentioned below is sandwiched between the layers (A) and (B) to firmly bond together the layers (A) and (B).

There are no special limitations on the adhesive resin (C) as long as it can bond together the two layers. Preferred Examples of the adhesive resin (C) are acid anhydride-modified products of olefin or diene-based polymers such as (1) polymers from graft polymerization of unsaturated carboxylic acid or its anhydride (e.g., maleic anhydride) to olefin-based polymers or copolymers (e.g., low density polyethylene (LDPE), linear low density polyethylene (LLDPE), super low density polyethylene (SLDPE), an ethylene-vinyl acetate copolymer, an ethylene-(meth)acrylic acid copolymer, and an ethylene-(meth)acrylic acid ester (methyl ester or ethyl ester)), (2) acid anhydride (e.g., maleic anhydride) modified product of hydrogenated styrene-butadiene copolymer, (3) acid anhydride modified product of liquid butanediene, and (4) acid anhydride modified product of ethylene-propylene-diene copolymer. As the thermoplastic resin (TR), in addition to the aforementioned blend, EVOH (A) and SPS (B), polyamide, polyolefin (e.g., polyethylene and polypropylene), heat resistant resins other than SPS can be used.

The multi-layer material of the present invention can take various layer structures, for example, layer (A)/layer (B), layer (B)/layer (A)/layer (B), layer (A)/layer (B)/layer (A)/layer (B), layer (B)/layer (A)/layer (B)/layer (A)/layer (B), or layer structures resulting from sandwiching layer (C) between at least one layer (A)/layer (B) or layer (B)/layer (A) of the above layer structures. The waste of the multi-layer material of the present invention which is recovered as resin composition of (A) and (B), or (A), (B) and (C) (hereinafter referred to as (Reg)) can be compounded to any suitable layer of the above layers, especially the layer (B), or can be provided as a (Reg) layer between layers. When (Reg) is compounded to the layer (B), the layer (B) becomes a layer of a resin composition containing (A), or (A) and (C). The blending ratio of (Reg) (ratio based on the total amount of virgin SPS (B) and (Reg)) is usually about 5 to 95% by weight.

One of the major advantages of the present invention is that even if (Reg) is used, there can be obtained a multi-layer material having the desired performance. Typical examples of the layer structure using (Reg) include layer (B)/layer (Reg)/layer (A)/layer (B), layer (B)/layer (Reg)/layer (A)/layer (Reg)/layer (B), layer (Reg)/layer (A)/layer (B), and layer structures resulting from sandwiching of the layer (C) between at least one layer (A)/layer (B) of the above layer structures. The layer (C) can be placed between layer (B)/layer (Reg), or layer (A)/layer (Reg). The (Reg) layer as used herein means a layer in which the waste recovered is used as such, or a layer in which the waste recovered is compounded to virgin (B). A sealant layer can be provided on the outside (one side or both sides) of the above layer structure, or another thermoplastic resin (e.g., polyolefin (polyethylene, polypropylene, etc.), polyester, polyamide or polycarbonate) layer can be provided on the outside (one side or both sides) or placed between suitable layers, within the range that does not deteriorate the objects of the present invention. Among them, a layer material in which the layer (B) is placed at the both sides of the layer (A) (a layer structure in which the layer (C) is placed between the layers (A) and (B) is the best) is most preferred from a viewpoint of gas barrier properties and heat resistance.

Examples of the multi-layer material of the present invention are a film, a sheet, a thermoplastic container (cup) obtained by vacuum and/or pressure molding of a film, a premolding such as a parison, a container (bottle) obtained by blow moding of a parison, a pipe, a parison obtained by cutting a pipe, a container (bottle) obtained by blow molding of the parison, and a container (bottle) obtained by direct blowing. The film includes a cover and a pouch.

A typical embodiment of the present invention will hereinafter be explained.

In the first place, a container which is one of the embodiments of the multi-layer material of the present invention is explained.

A container is generally produced by a method in which EVOH (A) and SPS (B) are coextruded to obtain a sheet or a parison, and the sheet or parison is quenched, heated again to 90° to 280° C., preferably 100° to 280° C., and stretch molded in a cut or bottle form. In accordance with another method, the desired molding is obtained by direct blow molding, coinjection molding or coinjection blow molding. Dimensional stability of the container at the time of heating (for example, at the time of heating in an oven range) can be increased by maintaining the temperature of a die at heat molding (e.g., vacuum molding and/or pressure molding) or blow molding in the range of 100° to 260° C., preferably 110° to 250° C., and treating in the die for 1 to 60 seconds, preferably 2 to 20 seconds. Care must be taken in removing the molding (container) from the die because the temperature of the molding is high and the molding is soft. In some cases, distortion of the container can be prevented by placing the molding in a die at a low temperature or blowing a cool air into the inside of the die at a high temperature. The container thus obtained has not only excellent gas barrier properties and heat resistance but also high drop strength.

Particularly in production of a container, it is important to reuse scraps (recovered) formed by trimming. Although reuse of the recovered scraps exerts influence on the transparency of the container, it exerts almost no influence on performance of the container and does not cause odor, coloration, geling or formation of gel or lump, and in some cases, even increases mechanical strength and interlayer peeling strength of the container.

A method of reusing the scraps recovered is such that the scraps are pulverized and after drying when wet, they are used as a (Reg) layer or compounded into the SPS (B) layer. In some cases, in order to increase dispersibility and heat stability of (Reg) and prevent deterioration at the time of molding the container, one or more of an antioxidant (e.g., hindered phenol-based, hindered amine-based, hindered phosphorus-based, or metallic soap), a dispersing agent (e.g., the adhesive resin (C)), a compatibilizer and a colorant can be added.

In the above container of the present invention, particularly a container having a layer (B) and/or a (Reg) layer on both sides of a layer (A), it is preferred that the layer (A) is located near the inside of the container or near the outside thereof because little foaming or distortion occurs at the heat treatment. It is particularly preferred that the layer (A) is located near the outside of the container, because the container then has excellent gas barrier properties, particularly gas barrier properties after retort treatment.

The total thickness of the barrel portion of the container is preferably 50 to 4 000 $\mu$m, the thickness of the layer (A) (total thickness in the case of a plurality of layers) is preferably 2 to 200 $\mu$m and most preferably 2 to 120 $\mu$m the thickness of the layer (B) (total thickness in the case of a plurality of layers or when the (Reg) layer is contained) is preferably 30 to 3,000 $\mu$m and most preferably 50 to 2,000 $\mu$m, and the thickness of the layer (C) (total thickness in the case of a plurality of layers) is preferably 2 to 200 $\mu$m and most preferably 5 to 100 $\mu$m.

The degree of thermal shrinkage of the barrel portion of the container (in the longitudinal direction) after heating for 30 minutes in an oven range maintained at 240° C., is not more than 10% and preferably not more than 6%. The degree of shrinkage of the barrel portion of the container (in the longitudinal direction) is calculated from the equation:

$$\frac{\text{(dimension before heating)} - \text{(dimension after heating)}}{\text{(dimension before heating)}} \times 100$$

Even if the container is treated under the same conditions as in retort sterilization (121° C., 30 minutes) and further heated for 30 minutes in an oven range maintained at 240° C., no distortion of the container considered due to delamination in the inside is observed.

A film which is another embodiment of the multi-layer material of the present invention will hereinafter be explained.

There can be employed for producing a film, a method in which (A) and (B), and further (C) if necessary are coextruded and thermally fixed (thermal-treated), a method in which they are, subjected to costretching (monoaxial or biaxial stretching) after coextrusion, and a method in which they are thermally fixed after costretching. In particular, a film obtained by costretching followed by thermally fixing is markedly decreased in film curling, local formation of unevenness and film whitening even in a heat resistance test (allowed to stand for 30 minutes in air maintained at 230° C.) and is excellent in transparency and drop-breakage resistance. The film of the present invention, when (Reg) is not used or an additive (filler) reducing transparency is not added, has excellent transparency and thus is useful as a food wrapping film, particularly a retort food wrapping film.

A film with excellent weather resistance, film strength and gas barrier properties can be formed when a raw sheet coextruded (typical layer structure: layer (B)/layer (C)/layer (A)/layer (C)/layer (B)) is thermally fixed at 110° to 250° C., preferably 160° to 240° C. for 0.1 to 60 seconds, preferably for 0.1 to 20 seconds, as such or after biaxial stretching (sequential or simultaneous stretching) at 90° to 250° C. and an area ratio of 5 to 80 times, preferably 9 to 80 times, and more preferably successively thermally fixed again at a temperature not more than the melting point of (A) for 0.1 to 60 seconds.

When (Reg) is used in film material as described above, if the EVOH concentration of the (Reg) layer is more than 10%, there is a danger that transparency is reduced. Thus it is desirable to decrease the EVOH concentration as much as possible in a film product in which transparency is important. A method in which virgin SPS is compounded to (Reg) is most suitable in decreasing the EVOH concentration.

Generally, the total film thickness is suitably 5 to 1,000 $\mu$m and most suitably 10 to 500 $\mu$m. The thickness of the layer (A) (total thickness in the case of a plurality of layers) is suitably 1 to 500 $\mu$m and most suitably 1 to 100 $\mu$m. The thickness of the layer (B) (total thickness in the case of a plurality of layers or in the case including the (Reg) layer) is suitably 10 to 1,000 $\mu$m and most 10 to 500 $\mu$m. The thickness of the layer (C) (total thickness in the case of a plurality of layers) is suitably 1 to 100 $\mu$m and most suitably 5 to 50 $\mu$m.

The aforementioned coextrusion method is the best for producing the film of the present invention. In addition, a method in which (A) is dry laminated on an unstretched (B) film or a stretched (B) film, and a method of extrusion laminating can be employed. Moreover, a film which has been laminated can be again stretched. A uniaxial stretching method can be employed as a stretching method.

In producing the multi-layer material of the present invention, a method can be employed in which an EVOH (A) solution, for example, a solution of EVOH in water and alcohol (isopropyl alcohol or n-propyl alcohol) is coated on the SPS (B) layer. In this case, an adhesive resin (for example, polyesteramide as described in Japanese Patent Application Laid-Open No. 144330/1985 and PCT Japanese Patent Application Laid-Open No. 501312/1985) can be compounded to the solution.

The multi-layer material of the present invention as obtained above, particularly the aforementioned container or film is markedly excellent in gas barrier properties and is excellent in heat resistance and thus is highly useful as a food container, suitable especially for retort treatment (121° C., 30 minutes) and for treatment with microwave ovens or grill oven ranges.

In connection with the weight ratio of EVOH (A) to SPS (B) in the resin composition of the present invention, (A):(B) is 5:95 to 95:5 and preferably 7:93 to 70:30, and most preferably 10:90 to 50:50. If (A):(B) is less than 5:95, the gas barrier properties are unsatisfactory. On the other hand, if (A):(B) is more than 95:5, the degree of thermal shrinkage increases and when heated at 240° C. in an oven, the resulting container is readily colored.

Uniformly dispersing EVOH and SPS is highly important because it exerts strong influences on the performance of the final container product. Thus a suitable method for preparing the resin composition is one in which EVOH and SPS are dry blended, melt extruded, and pelletized. It is desirable that an adhesive resin having adhesive properties (for example, an adhesive resin (C) as described hereinafter) to both of EVOH and SPS is added in an amount of 0.5 to 30 parts by weight, preferably 1 to 10 parts by weight per 100 parts by weight of the composition in order to more uniformly disperse EVOH and SPS, thereby removing unevenness in quality of the container product and further improving impact resistance.

A plasticizer, a thermal stabilizer, an ultraviolet ray absorber, an antioxidant, a colorant, a filler, a resin (e.g., polyamide and a partially saponified ethylene-vinyl acetate copolymer), a crystallization accelerator and the like can be blended.

Moldings obtained using the resin composition of the present invention include a film, a sheet, a container (cup) obtained by vacuum forming and/or pressure forming of a sheet, a preform, e.g., a parison, a container (bottle) obtained by blow molding a parison, a pipe, a parison obtained by cutting a pipe and a container (bottle) obtained by blow molding the parison, and a container (bottle) obtained by direct blow. The film includes a cover material and a pouch. These may be a single layer comprising a composition of (A) and (B), or may be multi-layer containing at least one layer of the composition of (A) and (B).

In production of a multi-layer material with at least one layer of the resin composition of the present invention, it is preferred for the multi-layer material to be produced by coextrusion of a resin composition (blend) of (A) and (B) and a thermoplastic resin. In addition, the multi-layer material can be produced by, for example, a dry lamination method, an extrusion lamination method, a coinjection method, or a solution coating method. In some cases, each layer is stretched (uniaxially or biaxially) before or after lamination, or after lamination, further thermally fixed. In many cases, placing an adhesive resin (C) layer between the blend (composition) layer and the thermoplastic resin layer is desirable because it enables firmly bonding both layers together.

The layer structure of multi-layer material using the resin composition of the present invention can include; blend layer/layer (A), blend layer/layer (B), blend layer/blend layer, blend layer/layer (A)/layer (B), layer (B)/blend layer/layer (A)/layer (B), blend layer/thermoplastic (TR) layer, blend layer/layer (A)/layer (TR), and those resulting sandwiching of layer (C) between at least one layer (A)/layer (B).

In production of a molding, particularly a container by thermal molding, heat treatment of the molding in a die (mold), heated to a sufficient temperature to achieve a desired degree of crystallization, imparts heat resistance to the molding. The temperature range of the die is 90° to 250° C. and preferably 120° to 220° C., and the molding is held in the die for 1 to 120 seconds, preferably 2 to 40 seconds. On the other hand, in production of a container by fabrication of a sheet or a parison, the container is quenched immediately after molding to minimize the degree of crystallization occuring after molding. It is desirable that the sheet or parison is heated as quickly as possible and thermally molded, and the heat molding temperature range is 90° to 280° C. and preferably 100° to 280° C.. The stretch ratio is, as an area ratio, not more than 20 times and preferably 3 to 15 times. Heat resistance is imparted to the container obtained by thermal molding, by treating the container in a die heated to a temperature sufficient to achieve the desired degree of crystallization. The temperature range of the die is 150° to 240° C. and suitably 160° to 230° C., and the container is held in the die for 1 to 200 seconds and suitably 2 to 60 seconds. Care must be taken in removing the container from the die because the container is high in temperature and it is soft. In some cases, the shape of the container is adjusted by again placing the container in a die maintained at a low temperature or blowing cool air into the inside of the die. In the container thus obtained, the degree of thermal shrinkage of the barrel portion of the container (in the longitudinal direction) is not more than 10% and preferably not more than 6% even when the container is heated for 30 minutes in an oven range maintained at 240° C. Even if the container is treated under the same conditions as in retort sterilization (120° C., 30 minutes) and further heated for 30 minutes in an oven range maintained at 240° C., no distortion of the container considered due to delamination in the inside is observed.

Scraps obtained by trimming in production of a molding (single-layer or multi-layer material) are pulverized and recovered as such or after pelletization. There are no special limitations as to a method of recovering scraps. For example, a method in which the scraps are pulverized, and after drying when they are wet, dry blended with the SPS, a method in which the pulverized scraps are pelletized and then dry blended with the SPS, and a method in which the pulverized scraps and the SPS are blended and pelletized can be employed. The proportion of the pulverized scraps to be blended (proportion based on the total weight of SPS and pulverized scraps) is usually about 5 to 95% by weight. At this time, in order to increase dispersability and thermal stability, and prevent distortion at the time of molding, it is sometimes preferred that one or more of an antioxidant, a dispersing agent, a compatibilizer and if necessary, a colorant be added.

In some cases, the scraps recovered (Reg) are compounded to the aforementioned blend layer or are formed into a layer provided near the blend layer.

The thickness of the molding is not critical. In general, the total thickness of the barrel portion is 200 to 3,000 μm, and the thickness ratio of the blend layer is 5 to 100%, suitably 10 to 80% based on the total thickness. The crystallinity of SPS layer in the multi-layer material is preferably at least 30% and more preferably at least 35%. If the crystallinity is less than 30%, heat resistance in the multi-layer material is not sufficient in some cases.

The desired crystallinity can be obtained by stretching, molding such as blow molding and pressure molding, and heat treatment.

The molding of the present invention as obtained above, particularly a container has excellent gas barrier properties and can be subjected to retort sterilization. Thus the container can be used to store food at ambient temperature for a long period of time. Moreover since the container is a food wrapping container having good heat resistance, the contents in the container can be heated by boiling, or in a microwave oven or a grill oven range (220° to 240° C.), without transferring them into another container.

The present invention is described in greater detail with reference to the following examples.

REFERENCE EXAMPLE 1

Production of Polystyrene having Mainly Syndiotactic Configuration

2 L (L=liter) of toluene as a solvent, and 5 mmol of tetraethoxytitanium and 500 mmol (as aluminum atom) of methylaluminoxane as catalyst components were placed in a reactor, and 15 L of styrene was introduced into the reactor and polymerized at 55° C. for 4 hours.

After completion of the reaction, the reaction product was washed with a mixed solution of hydrochloric acid and methanol to decompose and remove the catalyst components, and then dried to obtain 2.5 kg of a styrene-based polymer (polystyrene). This polymer was extracted with methyl ethyl ketone as a solvent in a Soxhlet's extractor to obtain an extraction residue of 97% by weight. The weight average molecular weight of the extraction residue was 400,000. In a $^{13}$C-NMR analysis (solvent 1,2-dichlorobenzene) of the polymer, an absorption ascribable to syndiotactic configuration was observed at 145.35 ppm. The syndiotacticity in racemic pentad as calculated from the peak area was 96%. The melting point was 268° C.

EXAMPLE 1

EVOH having an ethylene content of 32 mol %, a degree of saponification of 99.4% and MI of 1.3 g/10 min. as the EVOH (A), maleic anhydride-modified super low density polyethylene (MAn-modified SLDPE) as the adhesive resin (C), and SPS having a syndiotacticity of 96% and a melting point of 268° C. as obtained in Reference Example 1 were coextruded by the use of an apparatus for production of a five-layer sheet using three kinds of materials to thereby produce a sheet of SPS (B) (outside)/(C)/EVOH (A)/(C)/SPS (B) (inside). The thickness structure was 350 μm (outside)/50 μm/50 μm/50 μm/550 μm (inside).

This sheet was placed on a thermal molding machine, heated to 270° C., subjected to pressure molding, and then subjected to heat treatment for 10 seconds in a die maintained at 220° C. The crystallinity of SPS layer (outside) measured by Differential Scanning Calorimeter was 42%. The internal volume of the container with a squeezing ratio of 0.5 as obtained above was 100 ml, and the degree of thermal shrinkage after heating at 240° C. for 30 minutes in an oven was 4%. Gas barrier properties of the container, after adjusting humidity to 20° C.-65%RH, by the use of an $O_2$ barrier tester (produced by Mocon). The oxygen permeability speed (PO$_2$) of the EVOH layer was as good as 0.5 cc.20 μm/m$^2$.day.atm.

Water was placed in the container and also the container which had been heated at 240° C. for 30 minutes in an oven. After sealing the top cover, the container was dropped to a concrete floor at 5° C. from a height of 1 meter to conduct a breakage test. The container heated at 240° C. was broken at the tenth trial, but had a sufficiently high strength for practical use.

EXAMPLES 2 TO 4, AND COMPARATIVE EXAMPLES 1 TO 3

Containers were produced in the same manner as in Example 1 except that various conditions were changed as shown in Table 1. The results are shown in Table 1.

COMPARATIVE EXAMPLE 3A

Container was produced in the same manner as in Example 1 except that heat treatment was not carried out. The results are shown in Table 1.

EXAMPLE 5

EVOH (A) having an ethylene content of 32%, a degree of saponification of 99.4% and MI of 1.3g/10 min. as the EVOH (A), SPS having a syndiotacticity of 96% and a melting point of 268° C. as the SPS (B), and maleic anhydride-modified super low density polyethylene as the adhesive resin (C) were coextruded by the use of a molding machine for production of a five layer sheet using three kinds of material to thereby produce a quenched sheet. The layer structure was SPS (B)/(C)/EVOH (A)/(C)/SPS (B), and the thickness structure was 200/80/200/80/200 (μm). This sheet was stretched at 110° C. to 8 times in the machine direction (MD) and then at 120° C. to 4 times in the transverse direction (TD). This stretched film was thermally fixed at 230° C. for 10 seconds and again thermally fixed at 160° C. for 10 seconds. The film thus obtained was good in both transparency and appearance. This film was tested on an O$_2$ barrier tester (produced by Mocon).

The film exhibited very good gas barrier properties such that the gas permeation speed at 20° C.–65%RH was 0.3 cc.20 μm/m$^2$.day.atm. A thermal shrinkage test was conducted by heating at 240° C. for 30 minutes in an oven. Shrink properties were low such that the degree of thermal shrinkage was 2%, and the film surface after shrinkage was free from local unevenness and in a good condition. Also transparency was very good. A bag (10 cm × 10 cm) was produced using two films as obtained above, and 50 ml of water was placed in the bag. The bag containing water was dropped at 5° C. to a concrete floor from a height of 1 meter (dropping test). The bag was not broken until the tenth test.

EXAMPLES 6 TO 8 AND COMPARATIVE EXAMPLES 4 TO 5

Films were produced in the same manner as in Example 5 except that conditions were changed as shown in Table 2. The results are shown in Table 2.

EXAMPLE 9

EVOH having an ethylene content of 44 mol %, a degree of saponification of 99.4% and MI of 5.5 g/10 min. as the EVOH (A), maleic anhydride-modified super low density polyethylene as the adhesive resin (C), and SPS having a syndiotacticity of 96% and a melting point of 268° C. as the SPS (B) were coextruded by the use of an apparatus for production of a five layer sheet using three kinds of materials to produce a sheet of SPS (B) (outside)/(C)/EVOH (A)/(C)/SPS (B) (outside). The thickness structure was 100 (outside)/50/50/50/750 (inside) (μm).

This sheet was placed on a heat molding machine, heated to 270° C., subjected to pressure molding and then subjected to heat treatment for 10 seconds in a mold maintained at 220° C. The degree of thermal shrinkage of the container with a squeezing ratio of 0.5, after heating at 240° C. for 30 minutes in an oven, was 4%. Gas barrier properties of the container, after adjusting humidity to 20° C. - 65%RH, were measured by the use of an O$_2$ barrier tester (produced by Mocon). PO$_2$ of the EVOH layer was as good as 1.5 cc.20 μm/m$^2$.day.atm.

Salad oil was placed in this container and after sealing with an aluminum cover, the container was subjected to high temperature steam sterilization (retort) at 121 ° C. for 30 minutes. The container was allowed to stand for 5 days at 20° C. and 65%RH. At the end of this period, the top cover was opened, the salad oil was removed and the container was heated in an empty condition in an oven at 240° C. for 30 minutes. Distortion due to layer separation was not observed and the appearance was good. Gas barrier properties (20° C., 65%RH) after heating were good such that the PO$_2$ was 1.5 cc.20 μm/m$^2$.day.atm.

EXAMPLES 10 TO 12

Containers were produced in the same manner as in Example 9 except that various conditions were changed as shown in Table 3. The results are shown in Table 3.

EXAMPLE 13

EVOH having an ethylene content of 44 mol %, a degree of saponification of 99.4% and MI of 5.5 g/10 min. as the EVOH (A) an8 SPS having a syndiotacticity of 96% and a melting point of 268° C. as the SPS (B) were molded by the use of a coinjection stretch blow molding machine (produced by Nissei ASB) to produce a quenched paulson of three layer structure (layer (B)/layer (A)/layer (B)). This parison was again heated to 140° C., stretch blown at an air pressure of 15 kg/cm$^2$, and thermally fixed for 5 seconds in a die maintained at 240° C. to obtain a container with an internal volume of 500 ml. The degree of thermal shrinkage of the container, after heating at 240° C. for 30 minutes in an oven, was as small as 2.5%. Gas barrier properties, after adjusting humidity to 20° C.–65%RH, i.e., PO$_2$ of the EVOH layer was 1.8 cc.20 μm/m$^2$.day.atm.

EXAMPLE 14

A multi-layer bottle was produced by the use of a biaxial stretch blow molding machine for production of a five layer molding using three kinds of materials in place of the sheet production apparatus in Example 9. The temperature of the die was 80° C. The bottle thus obtained had good transparency. Even after retort sterilization at 121° C. for 30 minutes, gas barrier properties after adjusting humidity to 20° C.–65%RH (PO$_2$ of the EVOH layer) was 1.7 cc.20 μm/m$^2$. day.atm.

EXAMPLE 15

EVOH having an ethylene content of 44 mol %, a degree of saponification of 99.4% and MI of 5.5 g/10 min. as the EVOH (A) and SPS having a syndiotacticity of 96% and a melting point of 268° C. as obtained in Reference Example 1 as the SPA (B) were blended at a weight ratio of (A)/(B)=30/70. In the first place, a sheet of layer (B)/blend layer/layer (B) was produced by the use of an apparatus for production of a three layer sheet using two kinds of materials. The thickness structure was 300 μm/400 μm/300 μm. This sheet was placed on a heat molding machine and molded at a sheet temperature of 280° C. to obtain a cup. At this time, the temperature of the die was 220° C., and thermal fixation was carried out for 5 seconds. The degree of thermal shrinkage of the container with a squeezing ratio of 0.5, after heating at 240° C. for 30 minutes in an oven, was 4%. Gas barrier properties of the container, after adjusting to 20° C.-65%RH, were measured by the use of an $O_2$ barrier tester (produced by Mocon) and $PO_2$ of the blend layer was as good as 90 cc.20 μm/m2.day.atm.

Salad oil was placed in this container and after sealing with an aluminum cover, the container was subjected to high temperature steam sterilization (retort sterilization) at 121° C. for 30 minutes. The container was allowed to stand for 5 days at 20° C. and 65%RH. At the end of this period, the top cover was opened, the salad oil was removed and the container was heated in an oven range maintained at 240° C. for 30 minutes. No distortion due to layer separation was observed and the appearance was good. Gas barrier properties (20° C., 65%RH) after heating were good such that the $PO_2$ of the blend layer was 100 cc.20 μm/m².day.atm.

EXAMPLES 16 TO 18, AND COMPARATIVE EXAMPLES 6 TO 7

Containers were produced in the same manner as in Example 15 except that conditions were changed as shown in Table 4. The results are shown in Table 4.

EXAMPLE 19

EVOH having an ethylene content of 44 mol %, a degree of saponification of 99.4% and MI of 5.5 g/10 min. as the EVOH (A) and SPS having a syndiotacticity of 96% and a melting point of 268° C. as the SPS (B) were blended at a weight ratio of (A)/(B)=20/80 and pelletized with a extruder having an inside diameter of 40 mm. These pellets were molded with an injection stretch blow molding machine to produce a 300-millilitter cup with a thickness of the barrel portion of 600 μm. The injection temperature was 300° C., the blow area ratio was 4 times, the die temperature was 210° C., and the heat fixing time was 5 seconds. Gas barrier properties of the container were measured with an apparatus (produced by Mocon) under conditions at 20° C.-65%RH. $PO_2$ of the blend layer was 100 cc.20 μm/m².day.atm.

EXAMPLES 20 TO 21, AND COMPARATIVE EXAMPLE 8 TO 10

Containers were produced in the same manner as in Example 19 except that conditions were changed as shown in Table 5. The results are shown in Table 5.

TABLE 1

| | Starting Material | | | | | Thickness Structure of Barrel Portion of Container (μm) | | | |
|---|---|---|---|---|---|---|---|---|---|
| | EVOH (A) | | | SPS (B) | | | | | |
| | $C_2H_4$ Content (mol %) | MI (g/10 min.) | (C) | Syndiotacticity (%) | Melting Point (°C.) | SPS(B) (Outside) | (Reg) | (C) | EVOH(A) |
| Example 1 | 32 | 1.3 | MAn-modified SLDPE | 96 | 268 | 350 | — | 50 | 150 |
| Example 2 | 32 | 1.3 | MAn-modified SLDPE | 96 | 268 | 150 | 200 | 50 | 150 |
| Example 3 | 32 | 1.3 | MAn-modified SLDPE | 96 | 268 | 425 | — | 50 | 50 |
| Example 4 | 44 | 5.5 | MAn-modified SLDPE | 96 | 268 | 350 | — | 50 | 150 |
| Comparative Example 1 | — | — | MAn-modified SLDPE | 96 | 268 | 350 | — | 50 | 0 |
| Comparative Example 2 | 32 | 1.3 | MAn-modified SLDPE | — | — | — | — | 50 | 200 |
| Comparative Example 3 | 32 | 1.3 | MAn-modified SLDPE | HIPS* | | 350(HIPS) | — | 50 | 150 |
| Comparative Example 3A | 32 | 1.3 | MAn-modified SLDPE | 96 | 268 | 350 | — | 50 | 150 |

| | | Thickness Structure of Barrel Portion of Container (μm) | | | Crystallinity of SPS Layer (%) | After Oven Heating 240° C. · 30 min. | | |
|---|---|---|---|---|---|---|---|---|
| | No. | (C) | (Reg) | SPS(B) (Inside) | | $PO_2$** | Dropping Test (times) | Appearance |
| | Example 1 | 50 | — | 550 | 42 | 0.5 | 10 | good |
| | Example 2 | 50 | 200 | 350 | 43 | 0.4 | 9 | good |
| | Example 3 | 50 | — | 425 | 45 | 0.5 | 10< | good |
| | Example 4 | 50 | — | 550 | 43 | 1.9 | 10< | good |
| | Comparative Example 1 | 50 | — | 550 | 43 | $10^2$< | 3 | good |
| | Comparative Example 2 | 50 | — | — | — | 0.5 | 1 | distortion |
| | Comparative Example 3 | 50 | — | 550(HIPS) | — | impossible to measure | impossible to measure | serious distortion |
| | Comparative Example 3A | 50 | — | 550 | 25 | impossible to measure | impossible to measure | serious distortion |

*HIPS: High impact resistant polystyrene (Idemitsu Styrol ET-60)
**$PO_2$: Oxygen Permeation Speed of Blended Layer

TABLE 2

| Starting Material | |
|---|---|
| EVOH (A) | SPS (B) |

TABLE 2-continued

| No. | C₂H₄ Content (mol %) | MI (g/10 min.) | (C) | Syndiotacticity (%) | Melting Point (°C.) | Production of Original Sheet | Stretch Ratio | |
|---|---|---|---|---|---|---|---|---|
| Example 5 | 32 | 1.3 | MAn-modified SLDPE | 96 | 268 | Coextrusion | Sequential | 8 × 5 |
| Example 6 | 44 | 1.3 | MAn-modified SLDPE | 96 | 268 | Coextrusion | Simultaneous | 6 × 6 |
| Example 7 | 32 | 1.3 | MAn-modified SLDPE | 96 | 268 | Coextrusion | Simultaneous | 6 × 6 |
| Example 8 | 32 | 1.3 | Anchor Coat | 96 | 268 | Dry Lamination | Simultaneous | 6 × 6 |
| Comparative Example 4 | — | — | MAn-modified SLDPE | 96 | 268 | Extrusion | — | 8 × 5 |
| Comparative Example 5 | 32 | 1.3 | MAn-modified SLDPE | — | — | Extrusion | — | 3 × 3 |

| No. | Thermal Fixation Temperature (°C.) First Stage/Second Stage | Film Thickness (μm) SPS | (Reg) | (C) | EVOH | (C) | (Reg) | SPS | Crystallinity of SPS Layer (%) | Film Performance After Oven Heating 240° C. · 30 min. PO₂ | Appearance | Degree of Thermal Shrinkage (%) | Dropping Test (times) |
|---|---|---|---|---|---|---|---|---|---|---|---|---|---|
| Example 5 | 230/160 | 5 | — | 2 | 5 | 2 | — | 5 | 48 | 0.3 | good | 2 | 10 |
| Example 6 | 230/140 | 5 | — | 2 | 5 | 2 | — | 5 | 49 | 1.8 | good | 1.5 | 10< |
| Example 7 | 230/— | 5 | — | 2 | 5 | 2 | — | 5 | 49 | 0.5 | good | 2.5 | 8 |
| Example 8 | 230/160 | 5 | — | 2 | 5 | 2 | — | 5 | 49 | 0.4 | good | 2.5 | 7 |
| Comparative Example 4 | 230/160 | 5 | — | 2 | — | 2 | — | 5 | 49 | 10²< | good | 2 | 4 |
| Comparative Example 5 | 160 | — | — | 2 | 5 | 2 | — | — | — | 0.4 | poor | impossible to measure | impossible to measure |

TABLE 3

| | Starting Material | | | | | | |
|---|---|---|---|---|---|---|---|
| | EVOH (A) | | | SPS (B) | | Thickness Structure of Barrel Portion of Container (μm) | |
| No. | C₂H₄ Content (mol %) | MI (g/10 min.) | (C) | Syndiotacticity (%) | Melting Point (°C.) | SPS(B) (Outside) | (Reg) | (C) | EVOH(A) | (C) |
| Example 9 | 44 | 5.5 | MAn-modified SLDPE | 96 | 268 | 100 | — | 50 | 50 | 50 |
| Example 10 | 44 | 5.5 | MAn-modified SLDPE | 96 | 268 | 50 | 50 | 50 | 50 | 50 |
| Example 11 | 44 | 5.5 | MAn-modified SLDPE | 96 | 268 | 250 | — | 50 | 50 | 50 |
| Example 12 | 32 | 1.3 | MAn-modified SLDPE | 96 | 268 | 50 | — | 50 | 50 | 50 |

| No. | Thickness Structure of Barrel Portion of Container (μm) (Reg) | SPS(B) (Inside) | Crystallinity of SPS Layer (%) | Before Retort After Oven Heating 240° C. · 30 min. PO₂ | Appearance | Degree of Thermal Shrinkage (%) | After Retort After Oven Heating 240° C. · 30 min. Appearance | PO₂ |
|---|---|---|---|---|---|---|---|---|
| Example 9 | — | 750 | 43 | 1.5 | good | 4 | good | 1.5 |
| Example 10 | 300 | 250 | 42 | 1.3 | good | 3 | good | 1.3 |
| Example 11 | — | 600 | 43 | 1.3 | good | 4 | good | 1.3 |
| Example 12 | — | 800 | 44 | 0.5 | good | 4 | good | 0.5 |

TABLE 4

| | Starting Material | | | | | | | | |
|---|---|---|---|---|---|---|---|---|---|
| | EVOH (A) | | SPS (B) | | Blend Weight Ratio (A)/(B) | Thickness Structure of Barrel Portion of Container (μm) | | | |
| No. | C₂H₄ Content (mol %) | MI (g/10 min.) | Syndiotacticity (%) | Melting Point (°C.) | | SPS(B) | (Reg) | (C) | (A) + (B) Blend | (C) |
| Example 15 | 44 | 5.5 | 96 | 268 | 30/70 | 300 | — | — | 400 | — |
| Example 16 | 44 | 5.5 | 96 | 268 | 70/30 | 400 | — | 50 | 100 | 50 |
| Example 17 | 44 | 5.5 | 96 | 268 | 30/70 | 150 | 150 | — | 400 | — |
| Example 18 | 32 | 1.3 | 96 | 268 | 20/80 | 400 | — | — | 200 | — |
| Comparative Example 6 | — | — | 96 | 268 | 0/100 | 400 | — | 50 | 200 (B alone) | 50 |
| Comparative Example 7 | 32 | 1.3 | HIPS | | 20/80 | 400 | — | — | 200 | — |

| No. | Thickness Structure of Barrel Portion of Container (μm) (Reg) | SPS(B) | Crystallinity of SPS Layer (%) | Before Retort After Oven Heating 240° C. · 30 min. PO₂ | Appearance | Degree of Thermal Shrinkage (%) | After Retort After Oven Heating 240° C. · 30 min. Appearance | PO₂ |
|---|---|---|---|---|---|---|---|---|

TABLE 4-continued

| | | | | | | | | |
|---|---|---|---|---|---|---|---|---|
| Example 15 | — | 300 | 44 | 90 | good | 4 | good | 100 |
| Example 16 | — | 400 | 44 | 20 | good | 3 | good | 20 |
| Example 17 | 150 | 150 | 44 | 70 | good | 4 | good | 80 |
| Example 18 | — | 400 | 43 | 150 | good | 4 | good | 160 |
| Comparative Example 6 | — | 400 | 44 | 1000 | good | 4 | good | 1000 |
| Comparative Example 7 | — | 400 | — | impossible to measure | Serious distortion | impossible to measure | serious distortion | impossible to measure |

TABLE 5

| | Starting Material | | | | | | Thickness Structure of Barrel Portion of Container (μm) | | |
|---|---|---|---|---|---|---|---|---|---|
| | EVOH (A) | | SPS (B) | | Blend | | | | |
| NO. | C$_2$H$_4$ Content (mol %) | MI (g/10 min.) | Syndiotacticity (%) | Melting Point (°C.) | Weight Ratio (A)/(B) | Molding Method | SPS (B) | (A) + (B) Blend | SPS (B) |
| Example 19 | 44 | 5.5 | 96 | 268 | 20/80 | injection stretch below | — | 600 | — |
| Example 20 | 32 | 1.3 | 96 | 268 | 20/80 | injection stretch below | — | 600 | — |
| Example 21 | 32 | 1.3 | 96 | 268 | 20/80 | injection stretch below | 100 | 600 | 100 |
| Comparative Example 8 | — | — | HIPS | | 0/100 | injection stretch below | — | 600(HIPS alone) | — |
| Comparative Example 9 | 32 | 1.3 | HIPS | | 20/80 | injection stretch below | — | 600 | — |
| Comparative Example 10 | — | — | 96 | 268 | 0/100 | injection stretch below | — | 600(B alone) | — |

| | | | | After Heating 240° C. · 30 min. | | |
|---|---|---|---|---|---|---|
| | Crystallinity of | Before Heating | | | Degree of Thermal Shrinkage | |
| No. | SPS Layer (%) | Appearance | PO$_2$ | Appearance | (%) | PO$_2$ |
| Example 19 | 47 | good | 100 | good | 4 | 110 |
| Example 20 | 46 | good | 80 | good | 3 | 80 |
| Example 21 | 47 | good | 70 | good | 2 | 80 |
| Comparative Example 8 | — | good | 2000 | serious distortion | impossible to measure | impossible to measure |
| Comparative Example 9 | — | good | 500 | serious distortion | impossible to measure | impossible to measure |
| Comparative Example 10 | 48 | good | 1000 | good | 3 | 1000 |

What is claimed is:

1. A resin composition comprising a blend of 5 to 95 parts by weight of (A) a saponified product of an ethylene-vinyl acetate copolymer having an ethylene content of 20 to 60 mol % and a degree of saponification of at least 90% and 95 to 5 parts by weight of (B) a styrene-based polymer having mainly syndiotactic configuration.

2. The resin composition of claim 1, wherein the saponified product of the ethylene-vinyl acetate copolymer has an ethylene content of 25 to 50 mol %, a degree of saponification of at least 95% and a melt index of 0.1 to 50 g/10 minutes.

3. The resin composition of claim 2, wherein (B) is a styrene-based polymer having a syndiotactic configuration such that the proportion of structural units continuously connected to each other in a racemic pentad is at least 35%, said styrene-based polymer is a polymer selected from the group consisting of polystyrene, poly(alkylstyrene), poly(halogenated styrene), poly(alkoxystyrene), poly(vinylbenzoate), and mixtures thereof.

4. The resin composition of claim 2, wherein (B) is a styrene-based polymer selected from the group consisting of polystyrene, polymethylstyrene, polyethylstyrene, polyisopropylstyrene, poly(tert-butylstyrene), polychlorostyrene, polybromostyrene, polymethoxystyrene, polyethoxystyrene and a copolymer of styrene and paramethylstyrene and said styrene-based polymer has a weight average molecular weight of at least 10,000.

5. The resin composition of claim 3, wherein the weight ratio of (A) to (B) is 7:93 to 70:30, the styrene-based polymer has a crystallinity of at least 35% and a weight average molecular weight of 50,000 to 3,000,000 and the ethylene-vinyl acetate copolymer has an ethylene content of 25 to 50 mol %, a degree of saponification of at least 95% and a melt index of 0.5 to 20 g/10 minutes.

6. The resin composition of claim 3, wherein the saponified product of the ethylene-vinyl acetate copolymer has an ethylene content of 32 mol %, a degree of saponification of 99.4% and a melt index of 1.3 g/10 minutes; the styrene-based polymer has a syndiotactic configuration such that the proportion in a racemic pentad is 96% and the styrene-based polymer has a melting point of 268° C.

7. The resin composition of claim 5, wherein said styrene-based polymer is syndiotactic polystyrene.

8. The resin composition of claim 6, wherein said styrene-based polymer is syndiotactic polystyrene.

9. The resin composition of claim 1, wherein the ethylene-vinyl acetate copolymer has an ethylene content of 32 mol % and a degree of saponification of 99.4%.

10. The resin composition of claim 1, wherein a 20 μm film of said resin composition has an oxygen permeation speed PO$_2$ of 0.3–150 cc.20 μm/m$^2$.day.atm.

11. The resin composition of claim 10, wherein said oxygen permeation speed PO$_2$ is 0.3–1.9 cc.20 μm/m$^2$.day.atm.

* * * * *